Figure 1:
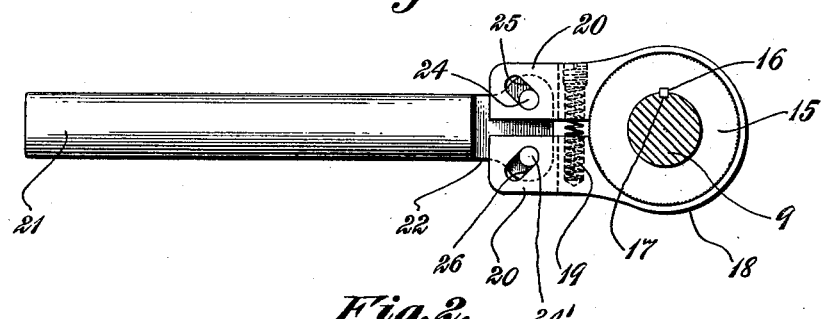

B. M. W. HANSON.
ADJUSTING MECHANISM.
APPLICATION FILED AUG. 10, 1912.

1,084,627.

Patented Jan. 20, 1914.

Witnesses:

Inventor:
B. M. W. Hanson
By his Attorneys,

COLUMBIA PLANOGRAPH CO., WASHINGTON, D. C.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

ADJUSTING MECHANISM.

1,084,627.   Specification of Letters Patent.   Patented Jan. 20, 1914.

Application filed August 10, 1912. Serial No. 714,341.

*To all whom it may concern:*

Be it known that I, BENGT M. W. HANSON, a citizen of the United States, residing at Hartford, in the county of Hartford and State of Connecticut, have invented certain new and useful Improvements in Adjusting Mechanisms, of which the following is a specification.

This invention relates to adjusting mechanism capable of general use but which is of especial advantage in conjunction with or as part of metal-working machines of various kinds, such for instance as a boring-mill in which connection the same, as to one form of embodiment thereof, is shown in the drawings accompanying and forming part of the present specification. Said form will be set forth fully in the following description the disclosure in question being primarily provided to enable those skilled in the art to practise the invention; from this it will be obvious that I do not limit myself to said disclosure as I may depart therefrom in several respects within the scope of the invention defined by the claims following said description.

In several different kinds of metal-working machines there are a slide and a shaft so related with the slide as to effect the adjustment of the latter. Usually the hand-wheel or lever which operates such a shaft to obtain the adjustment of the slide is at a point relatively remote from the work.

It is one of the purposes of the present invention to provide what might be considered auxiliary adjusting mechanism by which a slide or its equivalent can be readily and quickly moved, without the necessity of the attendant of the machine operating the wheel or lever mentioned, by reason of which he can secure the necessary adjustment or adjustments while he is closely inspecting the work.

Figure 2:
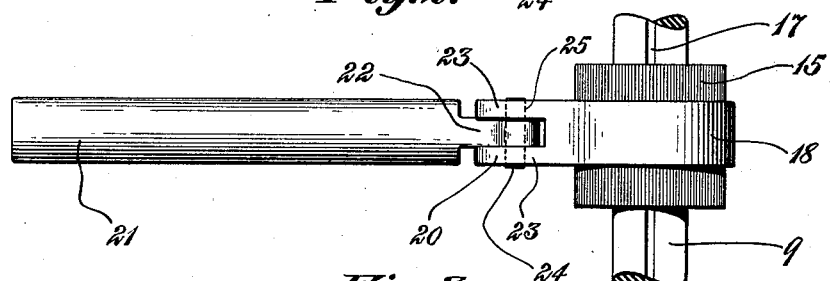

Referring to the drawings: Figure 1 is a side elevation of an adjusting device involving my invention, the shaft shown therein being in section. Fig. 2 is a top plan view of the parts shown in said Fig. 1, and, Fig. 3 is a front elevation of part of a boring mill equipped with adjusting mechanism embodying my invention.

Like characters refer to like parts throughout the several views which it will be perceived are on different scales.

Figure 3:
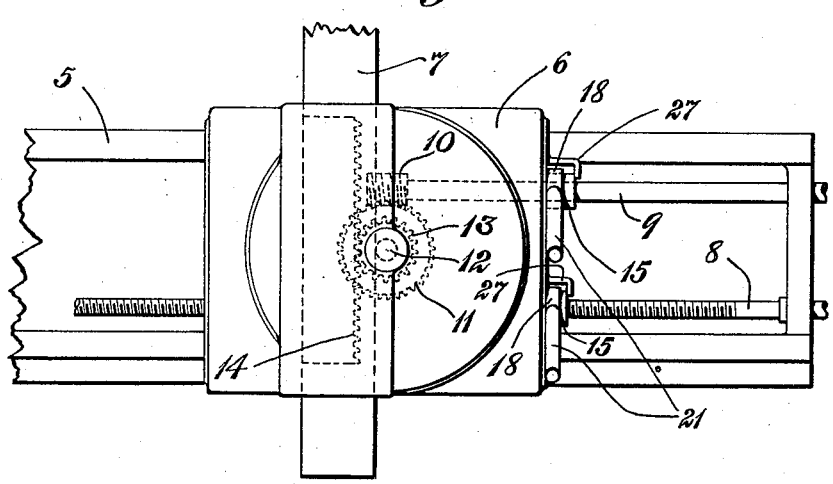

In Fig. 3 I have shown the cross-rail 5 of a boring-mill of known construction, the cross-slide 6 thereon, and the vertically-movable slide 7 to which latter the tool is generally directly connected, and adjusting-mechanism comprising my invention can be utilized for adjusting either or both of these slides or some analogous member. The cross-rail 5 supports the rotary shaft 8, the cross-slide 6 being furnished with a nut to receive said shaft 8 which is illustrated as threaded. The cross-rail also supports a second shaft 9 provided at its inner end with a worm 10 in mesh with the worm-gear 11 fastened to the shaft 12 carried by the cross-slide 6 and with which is rigid the pinion 13 in mesh with the rack 14 fastened to the vertically movable slide 7. The foregoing construction is quite common in boring mills as will be understood. The two non-endwise movable but rotary shafts 8 and 9 in practise are provided with hand-wheels or similar devices for turning the same. It will be clear that by turning the threaded shaft 8 the slide 6 can be adjusted on the cross-rail 5 while by rotating the shaft 9, the slide 7 can be adjusted on the companion slide. The two hand wheels or their equivalents are generally remote from the work but adjusting-mechanism including the invention is not necessarily so by reason of which the operator can watch the adjustment being made with respect to the work at close range. In the present case there is an adjusting mechanism associated with each of the shafts and as they are alike a detailed description of one, for instance that connected to the shaft 9, will apply to the other. Fitted to said shaft 9 is a collar 15 the latter being preferably rotative with and movable longitudinally of said shaft, for example by providing the sleeve with a key 16 to enter a longitudinally-extending keyway 17 in said shaft 9. Encircling the collar or sleeve 15 is a split or divided band or ring 18, which has two positions, one effective in which it is adapted to turn the collar or sleeve 15 and the other ineffective in which it is adapted to release or free said sleeve, and in the organization shown the last-mentioned relation is normally maintained in some suitable manner as by spring means, the spring 19 being illustrated for the purpose. Said ring or band is shown provided with outstanding lugs or ears 20 of practically duplicate construction, at its terminals and these are socketed to receive the ends of the coiled push spring 19 which tends constantly to separate said lugs and thereby expand the ring. By contracting said ring it will grip the sleeve or collar 15 and hence when said ring is turned the collar will be turned to effect through the intermediate described parts, the adjustment of the slide associated with the adjusting mechanism in use. Preferably the periphery of the sleeve or collar 15 is roughened so that notwithstanding the fact that there may be oil or grease thereupon the ring when contracted, can obtain a firm grip on said sleeve. In the construction shown, this roughening is secured by longitudinally scoring the sleeve or collar 15.

As a means for contracting the ring or band 18 to draw the same about the sleeve 15 and to also turn the same, to obtain the desired adjustment, I have shown the hand lever 21 represented as provided at its inner end with a flattened head 22 fitted between forks 23 of the lugs or ears 20. Said head 22 is shown provided with upper and lower pairs of studs or projections 24 and 24' respectively extending laterally therefrom, the upper studs extending into diagonally disposed slots 25 disposed in parallelism in the branches of the upper fork of the band or ring 18 while the lower projections 24' extend into parallel slots 26 in the lower fork, the two sets of slots diverging outwardly. When the ring or band 18 is in its ineffective or releasing position in which it is normally held by the spring 19 as already set forth, the lever will be also held by the spring in a horizontal position, it being understood of course that at such time the studs 24 will be at the lower end of the slots 25 while the studs 24' will be at the upper ends of the slots 26. When therefore the lever is swung either up or down, the band or ring will be, through the described construction, constricted about the sleeve or collar 15 and a firm grip obtained thereon so that on the swinging of said lever in either direction will turn the sleeve or collar 15 and thereby the shaft 9 which carries the same so that the slide 7 can be adjusted in either direction. By the organization described, the shaft 9 can be turned either by an oscillation of the hand lever 21 or the continuous movement thereof.

The slide 6 is shown having at one side thereof the fixed brackets or fingers 27 which engage against the outer sides of the sleeves so that when said slide is moved in one direction (toward the left as shown) said sleeves will be moved therewith while when said slide is moved in the opposite direction it carries the said sleeves therewith.

I desire to call attention to the fact that when the band 18 is constricted about the collar 15 in the manner also described it squeezes out any and all oil that may be within the same, such oil finding an escape by way of the longitudinal grooves in the periphery of said collar 3. Attention is also called to the fact that the lever or manually-operable member 21 is double-acting in that when moved in either direction from its neutral or ineffective position it is adapted to draw, through intermediate cam means, the ring or band 18 into gripping contact with the collar or sleeve 18.

What I claim is:

1. The combination of a shaft mounted for turning movement, a sleeve turnable with said shaft, a split band encircling said sleeve, the terminals of which have outwardly converging slots, a spring between said terminals, for normally expanding said band, and a lever provided with studs fitting said slots for contracting said band into gripping engagement with said sleeve.

2. Adjusting mechanism comprising a split band, the terminals of which have diagonally-disposed slots, and a hand lever provided with studs entering said slots, for constricting said band.

3. Adjusting mechanism comprising a split band, the terminals of which are bifurcated and the branches of the bifurcations having diagonally disposed slots, the slots of the respective bifurcations diverging outwardly, and a hand lever extending into the spaces between the bifurcations and provided with sets of studs entering the slots to cause the contraction of the band on the movement of said lever in either direction from a neutral position.

In testimony whereof I affix my signature in presence of two witnesses.

BENGT M. W. HANSON.

Witnesses:
W. K. STORRS,
C. M. GELLERT.

Copies of this patent may be obtained for five cents each, by addressing the "Commissioner of Patents, Washington, D. C."